(12) United States Patent
Suchy et al.

(10) Patent No.: US 9,702,640 B2
(45) Date of Patent: Jul. 11, 2017

(54) BAFFLE AND BAFFLE INSERTER FOR A TUBE WITH SLOTS HAVING SIDEWALLS

(71) Applicants: Walter Suchy, Montgomery, AL (US); Lester Pitts, Montgomery, AL (US)

(72) Inventors: Walter Suchy, Montgomery, AL (US); Lester Pitts, Montgomery, AL (US)

( * ) Notice: Subject to any disclaimer, the term of this patent is extended or adjusted under 35 U.S.C. 154(b) by 0 days.

(21) Appl. No.: 14/947,206

(22) Filed: Nov. 20, 2015

(65) Prior Publication Data

US 2017/0146306 A1 May 25, 2017

(51) Int. Cl.
*F28F 9/02* (2006.01)
*B23P 15/26* (2006.01)

(52) U.S. Cl.
CPC ............ *F28F 9/0212* (2013.01); *B23P 15/26* (2013.01); *F28F 9/0243* (2013.01)

(58) Field of Classification Search
CPC ......... Y10T 29/49902; Y10T 29/49945; Y10T 29/49389; F28F 9/0209; F28F 9/0212; F28F 9/0243; F28F 9/0204; F28F 9/0202; B23P 15/26; B23P 19/12
See application file for complete search history.

(56) References Cited

U.S. PATENT DOCUMENTS

| | | | | |
|---|---|---|---|---|
| 4,762,152 A | * | 8/1988 | Clausen | B21D 39/04 138/89 |
| 5,107,926 A | * | 4/1992 | Calleson | F28D 1/05383 165/153 |
| 5,125,454 A | * | 6/1992 | Creamer | F28F 9/001 165/149 |
| 5,207,738 A | * | 5/1993 | Dey | F28F 9/0212 165/153 |
| 5,209,292 A | * | 5/1993 | Arneson | F28F 9/0212 165/174 |
| 5,233,756 A | * | 8/1993 | le Gauyer | F28F 9/0212 29/890.043 |
| 5,329,995 A | * | 7/1994 | Dey | F28F 9/0212 165/153 |
| 5,481,800 A | * | 1/1996 | Hutto | B21D 53/085 29/890.043 |
| 5,586,600 A | * | 12/1996 | Cribari | F28F 9/0212 165/173 |
| 5,761,810 A | * | 6/1998 | Insalaco | B23P 11/005 29/727 |

(Continued)

*Primary Examiner* — Jason L Vaughan
(74) *Attorney, Agent, or Firm* — Incorporating Innovation LLC; Charlena Thorpe, Esq.

(57) ABSTRACT

Implementations of a tube, a baffle, and a baffle inserter are provided. In some implementations, the tube comprises one or more slots and a plurality of sidewalls that extend down from the outer surface of the tube into the tube on each elongated side of the slots. In some implementations, the baffle inserter comprises a baffle holder pivotably attached to a base at a first end where a portion of the base at the first end is slanted and a portion of the baffle holder is configured to rest on the slanted portion in a first position. In some implementations, to insert a baffle into the tube using the baffle inserter, the baffle is placed on the baffle holder in a first position and the baffle inserter is inserted inside the tube until the baffle contacts a stopper and pivots to a second position under a covered portion between two adjacent slots in the tube.

4 Claims, 5 Drawing Sheets

(56) References Cited

U.S. PATENT DOCUMENTS

| | | | | |
|---|---|---|---|---|
| 5,799,396 A | * | 9/1998 | Bosch | B23P 11/005 29/890.03 |
| 5,842,515 A | * | 12/1998 | Kim | B21D 53/02 165/153 |
| 5,898,996 A | * | 5/1999 | Buchanan | B21D 28/28 29/890.052 |
| 5,947,196 A | * | 9/1999 | Halm | F28F 9/002 165/153 |
| 6,082,447 A | * | 7/2000 | Insalaco | F28D 1/0408 165/153 |
| 6,115,918 A | * | 9/2000 | Kent | F28F 9/0212 165/173 |
| 6,317,966 B1 | * | 11/2001 | Insalaco | B23P 11/005 29/727 |
| 6,830,100 B2 | * | 12/2004 | Gowan | F28F 9/0212 165/153 |

* cited by examiner

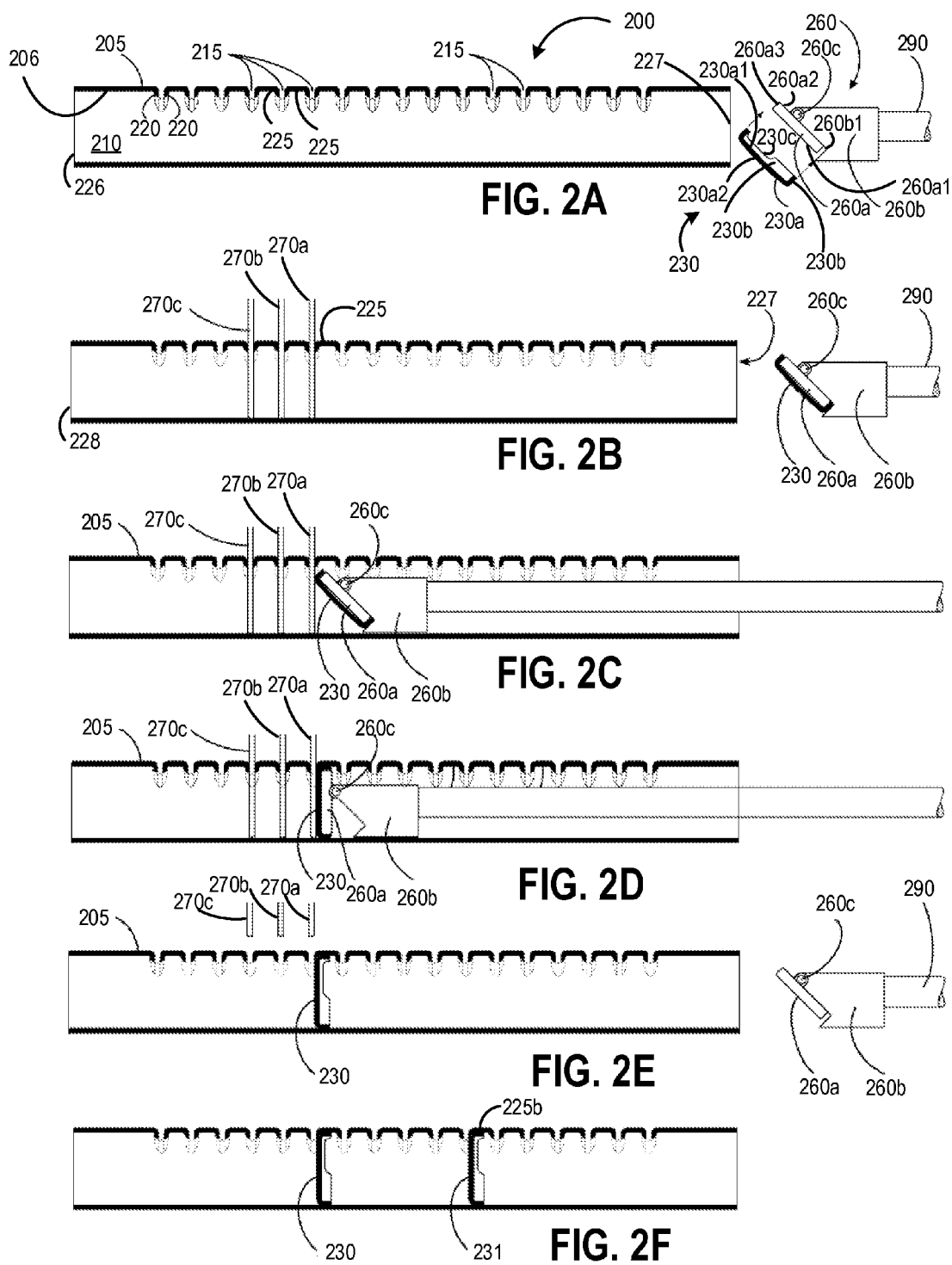

BAFFLE AND BAFFLE INSERTER FOR A TUBE WITH SLOTS HAVING SIDEWALLS

TECHNICAL FIELD

This disclosure relates to implementations of a baffle, a tube, and a baffle inserter.

BACKGROUND

Existing methods for inserting baffles into manifold tubes (e.g., condenser or evaporator manifold tubes) are time consuming and/or can negatively affect the structural integrity of the tube, among other problems.

For example, in some methods, a slot is made in a manifold tube wall to insert a baffle into the manifold tube. This method weakens the structural integrity of the manifold tube.

As another example, U.S. Pat. No. 6,317,966 discloses a tool for installing a baffle into a tubular member. Referring to FIGS. 1A-1C, the '966 patent discloses an installation tool 10 for gripping, installing, and securing a baffle 12 within a manifold 14. The '966 patent discloses that the baffle 12 is slightly undersized to maintain the position and orientation of the baffle 12 throughout the installation and securement process. The '966 patent discloses that an undersized baffle 12 is in contrast to prior art methods and tooling that rely on an interference fit between a baffle and manifold. As shown in FIGS. 1A-1C, the '966 patent discloses that after the baffle 12 is secured to the tool 10 and positioned in the manifold 14, the sidewall 20 of the baffle 12 is plastically deformed in order to permanently secure the baffle 12 in place within the manifold 14.

BRIEF DESCRIPTION OF THE DRAWINGS

FIGS. 2A-2F illustrate a length-wise cross-sectional side view of an example tube, a cross-sectional side view of a baffle, and a cross-sectional side view of a baffle inserter and method of using the same according to an implementation of the present disclosure.

DETAILED DESCRIPTION

Implementations of a tube, baffle, and baffle inserter are provided. In some implementations, the tube comprises one or more slots and a plurality of sidewalls that extend down from the outer surface of the tube into the tube on each elongated side of the slots. In some implementations, the baffle inserter comprises a baffle holder pivotably attached to a base at a first end where a portion of the base at the first end is slanted and a portion of the baffle holder is configured to rest on the slanted portion in a first position. In some implementations, to insert a baffle into the tube from a proximal end of a tube using the baffle inserter, the baffle is placed on the baffle holder in a first position and the baffle inserter is inserted inside the tube until the baffle contacts a stopper and pivots to a second position under a covered portion between two adjacent slots in the tube. In some implementations, the stopper is a blade inserted into one of the slots. In some implementations, the stopper is inserted from a distal end of the tube.

FIGS. 2A-2F illustrate a length-wise cross-sectional side view of an example tube 200, a cross-sectional side view of a baffle 230, and a cross-sectional side view of a baffle inserter 260 and method of using the same according to an implementation of the present disclosure.

In some implementations, the tube 200 is symmetrical. In some implementations, the baffle 230 is symmetrical. In some implementations, the baffle inserter 260 is symmetrical.

Figure 1A:
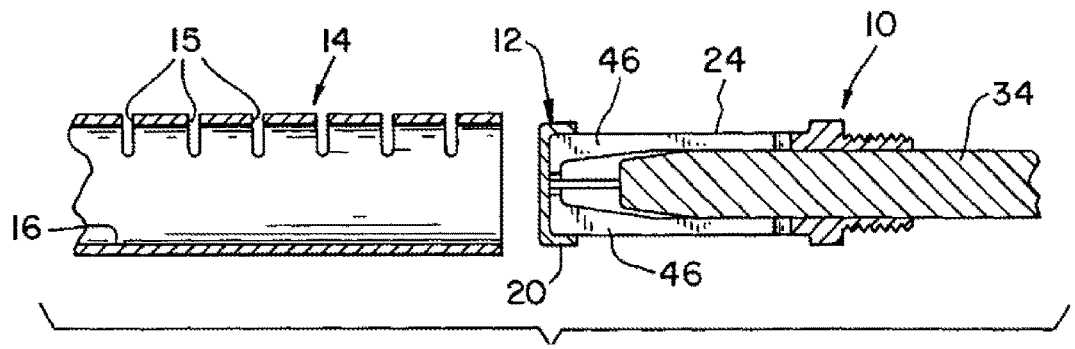
FIGS. 1A-1C illustrate a prior art method of installing a baffle into a tubular member.
Figure 1B:
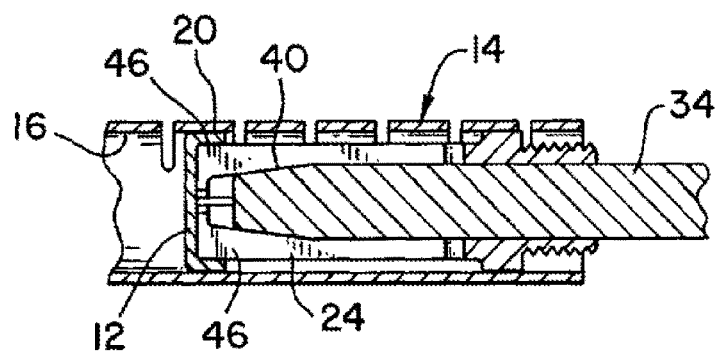
Figure 1C:
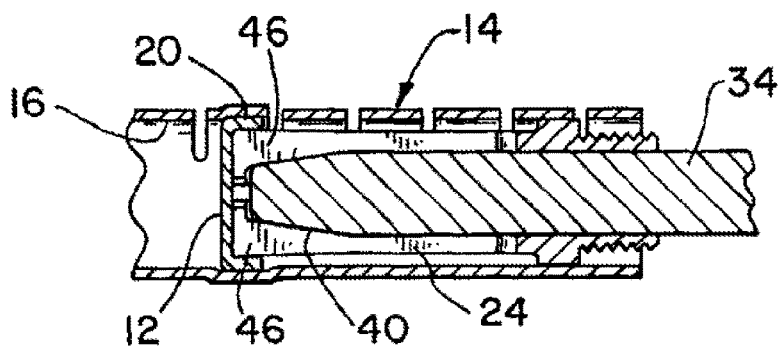
Figure 3:
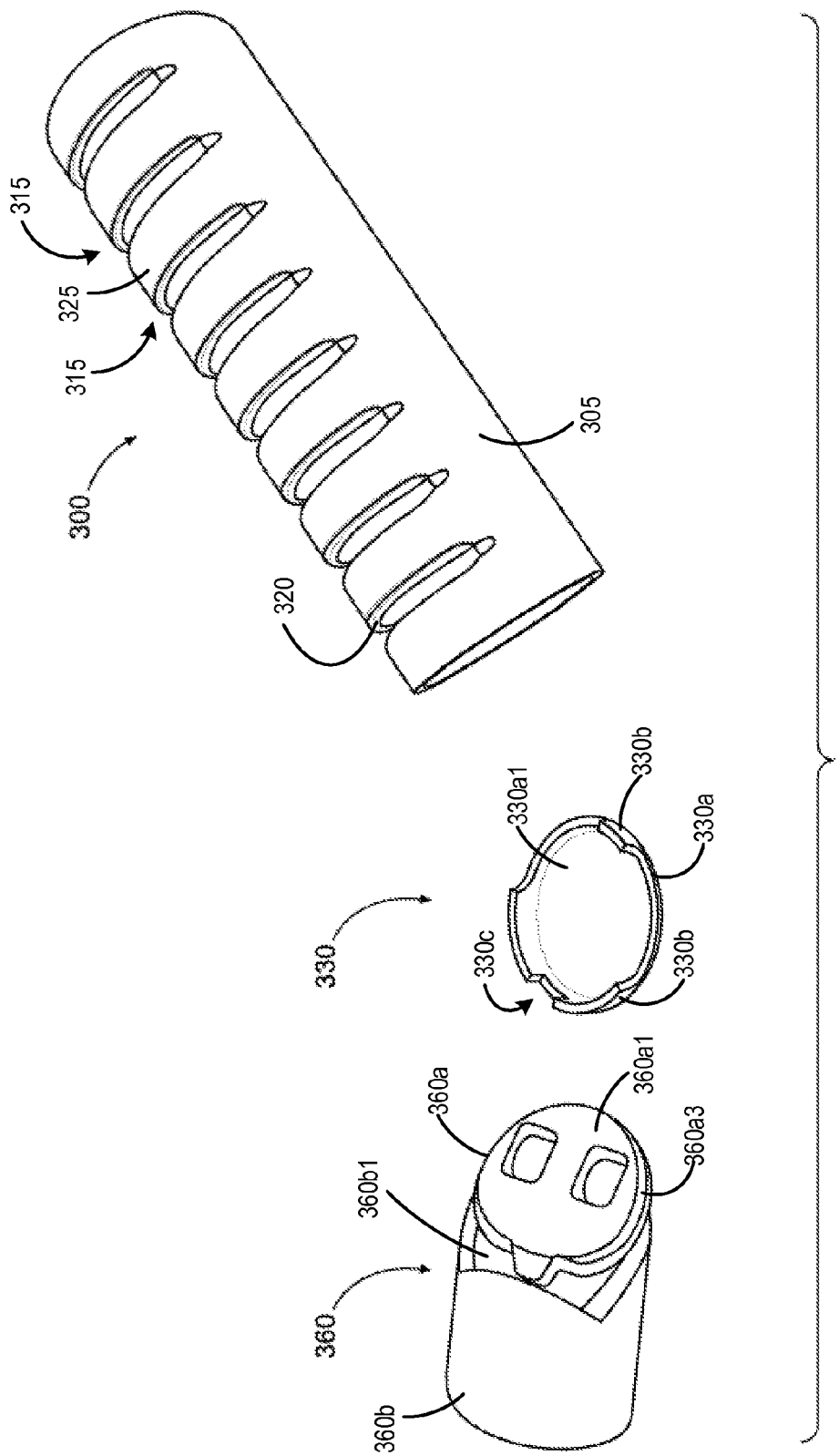
FIG. 3 illustrates a prospective view of an example tube, baffle, and baffle inserter according to another implementation of the present disclosure.

FIG. 3 illustrates a prospective view of an example tube 300, a baffle 330, and baffle inserter 360 according to another implementation of the present disclosure.

As shown in FIGS. 2A-2F, 3 the tube 200, 300 may include an outer surface 205, 305 enclosing a hollow portion or opening 210, 310. In some implementations, the tube 200, 300 may be a hollow elongated cylinder. In some implementations, the tube 200, 300 may be a manifold (e.g., a condenser or evaporator manifold tube for use, for example, in a heat exchanger). In some implementations, the tube 200, 300 may be any elongated, hollow object.

In some implementations, the tube 200, 300 may include one or more slots 215, 315 or elongated openings. In some implementations, each slot 215, 315 extends through and around a portion of the outer surface 205, 305 into the opening 210, 310. In some implementations, the slots 215, 315 are parallel to each other. In some implementations, the slots 215, 315 are spaced apart a predetermined distance thereby defining a plurality of covered portions 225, 325 between the slots 215, 315 along a portion of the tube 200, 300. In some implementations, the slots 215, 315 are equally spaced apart along a portion of the tube 200, 200.

In some implementations, sidewalls 220, 320 may extend down from the outer surface 205, 305 of the tube 200, 300 into the opening 210, 310 of the tube 200, 300 on one or both elongated sides of the slots 215, 315. In some implementations, the sidewalls 220, 320 may extend down into the opening about 2.54 mm from the inner surface 206 of the tube 220. In some implementations, the sidewalls 220 may extend down into the opening more than 2.54 mm from the inner surface 206 of the tube 220. In some implementations, the sidewalls 220 may extend down into the opening less than 2.54 mm from the inner surface 206 of the tube 220.

In some implementations, the baffle 230, 330 may comprise a base 230a sized and shaped to achieve the purpose of the baffle 230 (e.g., to stop or direct flow) when the baffle 230 is properly positioned in the tube 200.

In some implementations, the base 230a, 330a may have the same or substantially the same shape as that of the geometrical base 226 of the tube 200. In some implementations, the base 230a, 330a may be circular. In some implementations, the base 230a, 230a is any suitable shape.

One of ordinary skill in the art with the benefit of this disclosure would know how to size and shape the base 230a, 330a of a baffle to achieve the purpose of the baffle 230, 330 (e.g., to stop or direct flow) when the baffle 230, 330 is properly positioned in the tube 200, 300. In some implementations, the baffle 230, 330 is properly positioned in the tube 200, 300 when a normal to the base 230a, 330a is parallel to the axis of the tube 200, 300. In some implementations, the baffle 230, 330 is properly positioned in the tube 200, 300 when the base 230a, 330a helps stop or direct flow through the tube 200, 300. In some implementations, the baffle 230, 300 is properly positioned when the baffle 230, 330 (e.g., the base 230a, 330a) is positioned perpendicular to the inner surface 206 of the tube 200, 300.

In some implementations, the baffle 230, 330 may include a sidewall 230b, 330b extending from the periphery of the base 230a, 230a or a portion thereof such that the sidewall 230b, 330b extends around the base 230a or a portion thereof. In some implementations, the height of the sidewall 230b, 330b is sized such that a portion of the sidewall 230b, 330b may fit between two adjacent sidewalls 220, 320 of the tube 200, 300 when a baffle 230, 330 is placed under a covered portions 225, 325 between the two adjacent slots 215, 315 (see e.g., FIG. 2E). In other words, in some implementations, the height of the sidewall 230b, 330b of the baffle 230, 330 is less than or equal to the smallest distance between two sidewalls 220, 320 of the tube 200, 300.

In some implementations, the sidewall 230b, 330b of the baffle 230, 330 may include one or more cutouts (e.g., 230c, 330c). In some implementations, the cutouts in the sidewall 230b, 330b of the baffle 230, 330 provide the clearance needed to avoid damage to the tube slots while inserting the baffle.

In some implementations, the baffle inserter 260, 360 comprises a baffle holder 260a, 360a and a base 260b, 360b. In some implementations, the baffle holder 260a, 360a may be pivotably attached to a proximal end (i.e., the end closest to the tube 200) of the base 260b, 360b. In some implementations, the baffle holder 260a, 360a comprises a front surface 260a1, 360a1; back surface 260a2; and a side surface 260a3, 360a3.

In some implementations, the baffle holder 260a, 360a is sized such that the recess formed by the base 230a, 330a and sidewall 230b, 330b of the baffle 230, 330 can receive the baffle holder 260a, 360a (see, e.g., FIG. 2B). In some implementations, the baffle holder 260a, 360a is a flat, disc-shape object. In some implementations, the front surface 260a1, 360a1 of the baffle holder 260a, 360a may be the same shape as the interior surface 230a1, 330a1 of the base 230a, 330a of the baffle 230. In some implementations, the baffle holder 260a, 360a is sized such that the sidewall 230b, 330b of the baffle 230, 330 extend around the baffle holder 260a, 360a when the baffle 230, 330 is placed on the baffle holder 260a, 360a (see, e.g., FIG. 2B). In some implementations, the baffle holder 260a, 360a is sized such that the sidewall 230b, 330b of the baffle 230, 330 contacts the side surface 260a3, 360a3 of the baffle holder 260a, 360a when the baffle 230, 330 is placed on the baffle holder 260a, 360a.

In some implementations, the proximal end of the base 260b, 360b includes a cutout such that the proximal end of the base 260b, 360b has a slanted surface 260b1, 360b1. In some implementations, the normal to the surface 260b1, 360b1 points downwardly from the lengthwise direction of the base 260b, 360b when the baffle inserter 260, 360 is properly positioned.

In some implementations, the baffle holder 260a, 360a is pivotally attached at the proximal end of the base 260b, 360b such that a portion of the back surface 260a2 of the baffle holder 260a, 360a rests on the slanted surface 260b1, 360b1 in a first position. In this position, the normal to the front surface 260a1, 360a1 of the baffle holder 260a, 360a points downwardly from the lengthwise direction of the base 260b, 360b when the baffle inserter 260, 360 is properly positioned. When a force is applied to the baffle holder 260a, 360a, the baffle holder 260a, 360a may pivot (e.g. about point 260c) to a second position where, in some implementations, the back surface 260a2 of the baffle holder 260a, 360a may not rest on the slanted surface 260b1, 360b1. In some implementations, in the second position, the normal to the front surface 260a1, 360a1 of the baffle holder 260a may point in the direction of the lengthwise direction of the base 260b, 360b.

Similarly, when the baffle 230, 330 is placed on the baffle holder 260a, 360a (see, e.g., FIG. 2B) in the first position, the normal to the outer surface 230a2 of the base 230a, 330a of the baffle 230, 330 may point downwardly from the lengthwise direction of the base 260b, 360b. In this way, the baffle 230, 330 enters the tube 200, 300 at a first end 227 in a slanted position (e.g., the normal to the outer surface 230a2 of the base 230a, 330a of the baffle 230, 330 points downwardly from the axis of the tube 200, 300). This permits the top of the baffle 230, 330 to clear the sidewalls 220, 320 that extend down into the opening 210, 310 of the tube 200, 300 (see, e.g., FIG. 2C).

As shown in FIG. 2B, in some implementations, to insert and position a baffle 230 in a tube 200 under a covered portion 225 from a proximal side 227 of the tube 200, a first blade 270a may be inserted into a slot 215 adjacent to and behind (e.g., in the direction of the distal side 228 of the tube 200) the covered portion 225. In other words, the first blade 270a may be inserted into the closest slot 215 behind (e.g., in the direction of the distal side 228 of the tube 200) the covered portion 225.

In some implementations, one or more additional blades (e.g., 270b, 270c) may be inserted into additional slots behind the covered portion 225. In some implementations, the one or more additional blades may be inserted into the closest slots behind the slot that the first blade is inserted. In some implementations, the one or more blades may help to stabilize the outer surface 205 of the tube as the baffle is inserted into the tube.

As shown in FIG. 2C, after the baffle 230 is placed on the baffle holder 260a, the baffle 230 may be inserted into the tube 200 at an angle (e.g., the normal to the outer surface 230a2 of the base 230a of the baffle 230 points downwardly from the axis of the tube 200). In some implementations, the baffle 230 may be inserted into the tube 200 by inserting the baffle inserter 260 holding the baffle 230 inside the opening 210 of the tube 200 at the proximal end 227 of the tube 200 using, for example, a hydraulic cylinder 290.

As the baffle inserter 260 is inserted into the tube 200, the baffle 230 will make contact with the first blade 270a and a force will be applied to the baffle holder 260a. As shown in FIG. 2D, the force may cause the baffle holder 260a and baffle 230 to pivot clockwise to a second position. In some implementations, the baffle inserter 260 may be inserted into the tube 200 until the baffle 230 is positioned under the cover portion 225.

In some implementations, the baffle inserter 260 may be inserted into the tube 200 until the baffle holder 260a and baffle 230 are pivoted such that the normal to the outer surface 230a2 of the base 230a of the baffle 230 is parallel to the axis of the tube 200. In some implementations, the baffle inserter 260 may be inserted into the tube 200 until a portion of the sidewall 230b of the baffle 230 is positioned under the covered portion 225. In some implementations, the baffle inserter 260 may be inserted into the tube 200 until the baffle 230 is properly positioned in the tube 200 such that the base 230a can help stop or direct flow through the tube 200. In some implementations, the baffle inserter 260 may be inserted into the tube 200 until the outer surface 230a2 of the base 230a of the baffle 230 is touching the first blade 270a.

In some implementations, the baffle inserter 260 may be inserted into the tube 200 until the baffle 230 is at any desired position.

As shown in FIG. 2E, once the baffle 230 is positioned in the tube 200 under a covered portion 225, the baffle inserter 260 and one or more blades 270 may be removed from the tube 200.

As shown in FIG. 2F, the above method may be repeated to insert and position a second baffle 231 in the tube 200 under a second covered portion 225b from a proximal side 227 of the tube 200. In some implementations, the second baffle 231 may be closer to the proximal side of the tube 200 than the first baffle 230.

Because the baffles 230 are under the covered portions in between the slots, in some implementations, markings may be placed on the outer surface 205 of the tube 200 to indicate the location of the baffles. In some implementations, the markings may be indentations made in the outer surface 205. In some implementations, the markings may be any suitable markings. In some implementation, a marking for a baffle location may consist of two indicators (e.g., indentations or other markings) on each side of baffle. In some implementations, the markings may be made on the outer surface of the tube on a portion of the outer surface opposite the slots. In some implementations, the markings can be on any suitable portion of the outer surface.

Figure 4A:
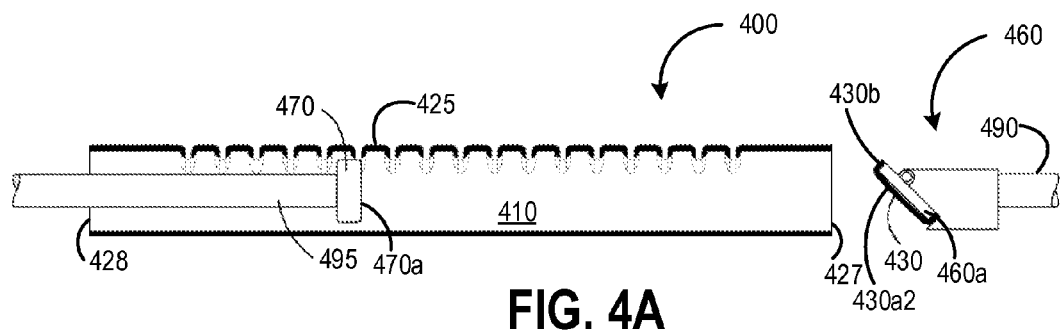
FIGS. 4A-4D illustrate another example method of inserting a baffle into a tube according to an implementation of the present disclosure.
Figure 4B:
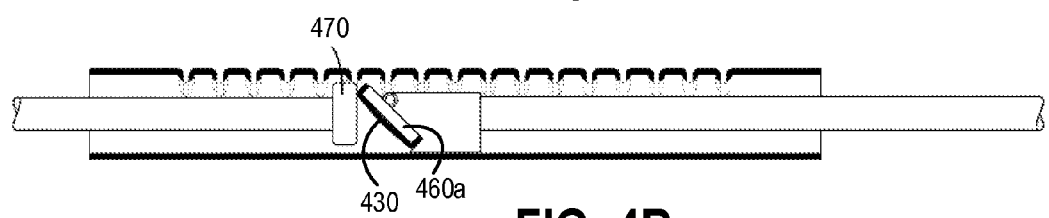
Figure 4C:
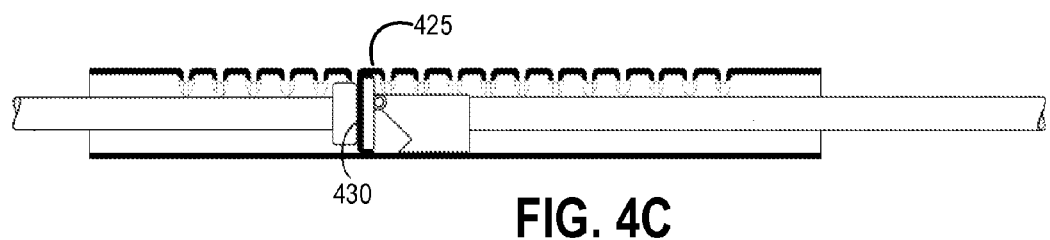

FIGS. 4A through 4C illustrate another example method of inserting a baffle 430 in a tube 400 according to an implementation of the present disclosure.

As shown in FIG. 4A, in some implementations, to insert and position a baffle 430 in a tube 400 under a covered portion 425 from a proximal side 427 of the tube 400, a stop 470 is inserted into the tube 400 from a distal side 428 until the front surface 470a of the stop 470 is positioned under a slot adjacent to and behind (e.g., in the direction of the distal side of the tube 400) the covered portion 425. In other words the front surface 470a of the stop 470 is positioned under the closest slot behind (e.g., in the direction of the distal side 428 of the tube 400) the covered portion 425.

In some implementations, the stop 470 may be a piece of material sized to be received by the tube 400. In some implementations, the height the stop 470 is small enough such that the stop 470 does not make contact with the sidewalls 220 and the interior surface of the tube 400 as the stop 470 is inserted into the tube 400. In some implementations, the stop 470 is rectangular. In some implementations, the stop 470 may be any suitable shape. In some implementations, the stop 470 has a flat front surface 470a.

In some implementations, the stop 470 may be inserted into the tube 400 using, for example, a hydraulic cylinder 495.

As shown in FIG. 4B, after the baffle 430 is placed on the baffle holder 460a, the baffle 430 may be inserted into the tube 400 at an angle (e.g., the normal to the outer surface 430a2 of the base 430a of the baffle 430 points downwardly from the axis of the tube 400). In some implementations, the baffle 430 may be inserted into the tube by inserting the baffle inserter 460 holding the baffle 430 inside the opening 410 of the tube 400 at the proximal end 427 of the tube 400 using, for example, a hydraulic cylinder 490.

As the baffle inserter 460 is inserted into the tube 400, the baffle 430 will make contact with front surface 470a of the stop 470 and a force will be applied to the baffle holder 460a. As shown in FIG. 4C, the force may cause the baffle holder 460a and baffle 430 to pivot clockwise to a second position.

In some implementations, the baffle inserter 460 may be inserted into the tube 400 until the baffle 430 is positioned under the cover portion 425.

In some implementations, the baffle inserter 460 may be inserted into the tube 400 until the baffle holder 460a and baffle 430 are pivoted such that the normal to the outer surface 230a2 of the base 430a of the baffle 430 is parallel to the axis of the tube 400. In some implementations, the baffle inserter 460 is inserted into the tube 400 until a portion of the sidewall 430b of the baffle 430 is positioned under the covered portion 425. In some implementations, the baffle inserter 460 may be inserted into the tube 400 until the baffle 430 is properly positioned in the tube 400 such that the base 430a can help stop or direct flow through the tube 400. In some implementations, the baffle inserter 460 may be inserted into the tube 400 until the outer surface 430a2 of the base 430a of the baffle 430 is touching the front surface 470a of the stop 470. In some implementations, the baffle inserter 460 may be inserted into the tube 400 until the baffle 430 is at any desired position.

Figure 4D:

As shown in FIG. 4D, once the baffle 430 is positioned in the tube 400 under a covered portion 425, the baffle inserter 460 and stop 470 are removed from the tube 400.

Figure 5:
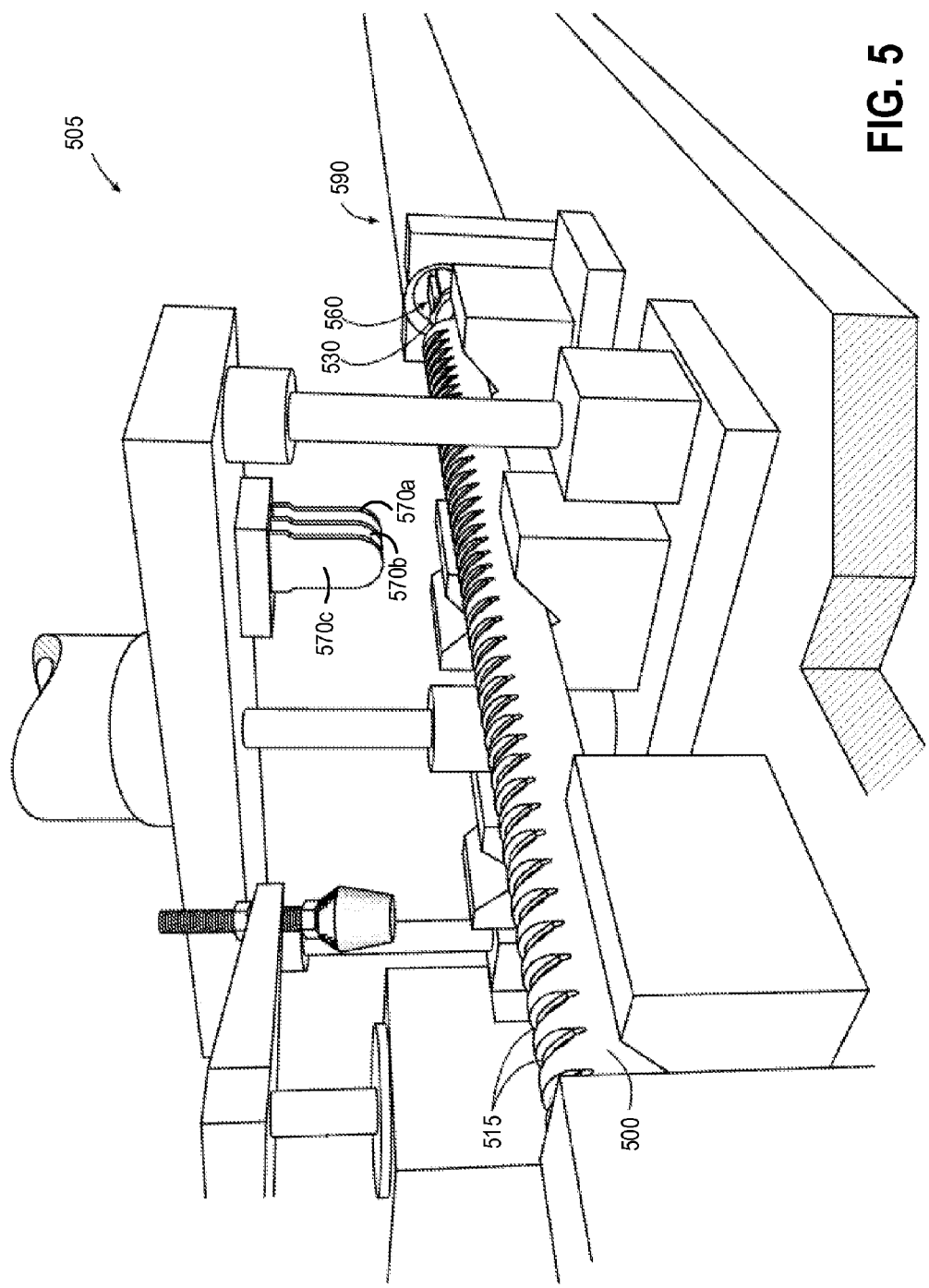
FIG. 5 illustrates an example environment for inserting a baffle into a tube according to an implementation of the present disclosure.

FIG. 5 illustrates an example environment 505 for inserting a baffle 530 in a tube 500 according to an implementation of the present disclosure. FIG. 5 illustrates a tube 500 resting on a plurality of v-blocks 501, a baffle 530, and a baffle inserter 560. FIG. 5 also illustrates a plurality of blades 570a, 570b, 570c mounted on an assembly for inserting the blades into respective slots 515 of the tube 500.

As discussed above, to insert and position a baffle 530 in the tube 500 under a covered portion 525 from a proximal side of the tube 500, in some implementations, at least a first blade 570a may be inserted into a slot adjacent to and behind (e.g., in the direction of the distal side of the tube 500) the covered portion. In other words, the first blade 570a may be inserted into the closest slot behind (e.g., in the direction of the distal side of the tube) the covered portion. In some implementations, the baffle 530 may be inserted into the tube 500 by inserting the baffle inserter 560 holding the baffle 530 inside the opening of the tube 500 at the distal end of the tube using, for example, a hydraulic cylinder 590.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A method of inserting a baffle in a tube from a proximal side of the tube wherein the baffle is inserted inside a hollow portion of the tube, wherein an outer surface of the tube includes a covered portion, the covered portion defined by a portion of the outer surface that is located between at least two adjacent slots that are formed in the outer surface of the tube, wherein the baffle is inserted proximal to the covered portion using a baffle inserter, the method comprising:
    positioning the tube,
        wherein the outer surface of the tube encloses the hollow portion of the tube and the hollow portion comprises a first end and a second end;
        wherein the outer surface comprises the at least two adjacent slots, the at least two adjacent slots extending through and around a portion of the outer surface into the hollow portion; and the tube comprises a plurality of sidewalls that extend from the outer surface of the tube into the hollow portion on elongated sides of the at least two adjacent slots,
        wherein the tube is configured for insertion of the baffle inside the tube using the baffle inserter
    inserting the baffle from a proximal side of the tube,
        wherein the baffle is inserted inside the hollow portion approximal to the covered portion of the tube;
    placing the baffle on a baffle holder of the baffle inserter,
        wherein the baffle comprises a base and a sidewall extending from a periphery of the base,
        wherein the baffle inserter comprises the baffle holder,
        wherein the baffle holder is configured to hold the baffle and the baffle holder comprises a base,
        wherein the baffle holder is pivotably attached to the base of the baffle inserter at a first end of the base such that the baffle holder assumes a first position when no force is applied to the baffle holder and when a force is applied to the baffle holder the baffle holder pivots to a second position,
        wherein a slanted portion of the base of the baffle inserter, located at the first end of the base, is slanted relative to a longitudinal axis of the tube and a portion of the baffle holder is configured to rest on the slanted portion of the base when the baffle holder is in the first position,
        wherein when the baffle holder is in the second position, the baffle inserter is configured such that a front surface of the baffle holder is positioned perpendicular relative to the longitudinal axis of the tube,
        wherein placing the baffle on the baffle holder comprises placing the baffle on the baffle holder with the baffle holder in the first position;
    inserting a first blade into at least one of the at least two adjacent slots;
    inserting the baffle inserter, with the baffle placed on the baffle holder and the baffle holder positioned in the first position, into the hollow portion of the tube from the proximal side toward a distal side, that is opposite the proximal side, of the tube thereby clearing the sidewalls of the tube until the baffle contacts the first blade and pivioting the baffle holder to the second position thereby pivoting the baffle relative to the covered portion of the tube such that the base of the baffle is perpendicular relative to the longitudinal axis of the tube; and
    removing the first blade and the baffle inserter from the tube.

2. The method of claim 1 further comprising inserting one or more additional blades into the at least two adjacent slots.

3. The method of claim 1 further comprising marking the outer surface of the tube where the baffle is located.

4. A method of inserting a baffle in a tube from a proximal side of the tube wherein the baffle is inserted inside a hollow portion of the tube, wherein an outer surface of the tube includes a covered portion, the covered portion defined by a portion of the outer surface that is located between at least two adjacent slots that are formed in the outer surface of the tube, wherein the baffle is inserted proximal to the covered portion using a baffle inserter, the method comprising:
    positioning the tube,
        wherein the outer surface of the tube encloses the hollow portion of the tube and the hollow portion comprises a first end and a second end;
        wherein the outer surface comprises the at least two adjacent slots, the at least two adjacent slots extending through and around a portion of the outer surface into the hollow portion; and the tube comprises a plurality of sidewalls that extend from the outer surface of the tube into the hollow portion on elongated sides of the at least two adjacent slots,
        wherein the tube is configured for insertion of the baffle inside the tube using the baffle inserter
    inserting the baffle from a proximal side of the tube,
        wherein the baffle is inserted inside the hollow portion approximal to the covered portion of the tube;
    placing the baffle on a baffle holder of the baffle inserter,
        wherein the baffle comprises a base and a sidewall extending from a periphery of the base,
        wherein the baffle inserter comprises the baffle holder,
        wherein the baffle holder is configured to hold the baffle and the baffle holder comprises a base,
        wherein the baffle holder is pivotably attached to the base of the baffle inserter at a first end of the base such that the baffle holder assumes a first position when no force is applied to the baffle holder and when a force is applied to the baffle holder the baffle holder pivots to a second position,
        wherein a slanted portion of the base of the baffle inserter, located at the first end of the base, is slanted relative to a longitudinal axis of the tube and a portion of the baffle holder is configured to rest on the slanted portion of the base when the baffle holder is in the first position,
        wherein when the baffle holder is in the second position, the baffle inserter is configured such that a front surface of the baffle holder is positioned perpendicular relative to the longitudinal axis of the tube,
        wherein placing the baffle on the baffle holder comprises placing the baffle on the baffle holder with the baffle holder in the first position
    inserting a stop inside the hollow portion of the tube from a distal side of the tube, that is opposite the proximal side until a front surface of the stop is positioned proximal to one of the at least two adjacent slots;
    inserting the baffle inserter, with the baffle placed on the baffle holder and the baffle holder positioned in the first position, into the hollow portion of the tube from the proximal side toward a distal side, that is opposite the proximal side, of the tube until the baffle contacts the front surface of the stop and pivoting the baffle holder to the second position thereby pivoting the baffle relative to the covered portion of the tube such that the base of the baffle is perpendicular relative to the longitudinal axis of the tube; and
    removing the stop and the baffle inserter from the tube.

* * * * *